United States Patent
Xu

(10) Patent No.: US 8,013,266 B2
(45) Date of Patent: Sep. 6, 2011

(54) KEY BUTTON AND KEY ASSEMBLY USING THE KEY BUTTON AND PORTABLE ELECTRONIC DEVICE USING THE KEYPAD ASSEMBLY

(75) Inventor: Xin Xu, Shenzhen (CN)

(73) Assignees: Shenzhen Futaihong Precision Industry Co., Ltd., ShenZhen, Guangdong Province (CN); Chi Mei Communication Systems, Inc., Tu-Cheng, New Taipei (TW)

( * ) Notice: Subject to any disclaimer, the term of this patent is extended or adjusted under 35 U.S.C. 154(b) by 390 days.

(21) Appl. No.: 12/407,163

(22) Filed: Mar. 19, 2009

(65) Prior Publication Data

US 2010/0025212 A1    Feb. 4, 2010

(30) Foreign Application Priority Data

Jul. 31, 2008   (CN) .......................... 2008 1 0303266

(51) Int. Cl.
*H01H 3/12* (2006.01)
(52) U.S. Cl. ...................................................... 200/341
(58) Field of Classification Search .................. 200/5 A, 200/314, 341, 344, 521; 340/388.1, 384.1, 340/388.6, 390.2, 407.1; 381/396, 398
See application file for complete search history.

(56) References Cited

U.S. PATENT DOCUMENTS

| | | | | |
|---|---|---|---|---|
| 2,690,547 A | * | 9/1954 | Marks et al. | 187/298 |
| 5,956,622 A | * | 9/1999 | Lee | 340/7.6 |
| 6,600,938 B1 | * | 7/2003 | Suzuki | 455/567 |
| 7,332,688 B2 | * | 2/2008 | Browne et al. | 200/512 |
| 2005/0145472 A1 | * | 7/2005 | Beckwith et al. | 200/521 |
| 2009/0251384 A1 | * | 10/2009 | Ligtenberg et al. | 343/904 |

* cited by examiner

*Primary Examiner* — Edwin A. Leon
(74) *Attorney, Agent, or Firm* — Altis Law Group, Inc.

(57) ABSTRACT

A portable electronic device is provided. The portable electronic device includes the keypad assembly. The keypad assembly includes key buttons. The key button includes a circuit board portion; a pad portion made of elastic material and fixed on the circuit board portion; a supporting portion forming a cavity and connecting to the circuit board portion; a key portion slidably positioned on the supporting portion and forming a containing area between the key portion and supporting portion; and a vibrating portion contained in the cavity formed by the supporting portion and the containing area, the vibrating portion being powered by the circuit board portion, such that when the vibrating portion is powered on and off, the vibrating portion vibrates and makes the key portion slide along the supporting portion.

19 Claims, 2 Drawing Sheets

KEY BUTTON AND KEY ASSEMBLY USING THE KEY BUTTON AND PORTABLE ELECTRONIC DEVICE USING THE KEYPAD ASSEMBLY

CROSS-REFERENCE TO RELATED APPLICATION

This application is related to a co-pending U.S. patent application Ser. No. 12/407,146, entitled "MOBILE COMMUNICATION DEVICE AND AN INCOMING CALLER NUMBER PROMPT METHOD THEREOF", by Xin Xu. Such application has the same assignee as the present application and is concurrently filed herewith. The disclosure of the above-identified application is incorporated herein by reference.

BACKGROUND OF THE INVENTION

1. Field of the Invention

The present invention relates to portable electronic devices, particularly to a key button, a keypad assembly using the key button, and a portable electronic device using the keypad assembly.

2. Description of Related Art

With development of the wireless communication technology, portable electronic devices, such as mobile handsets have been increasingly widely used with a multiplicity of functions. A caller number prompt function may be provided by the communication service provider. With the caller number prompt, the caller number can be identified before a call is received.

Usually, the incoming caller number prompt includes displaying the incoming number in the liquid crystal display (LCD), handset vibrating and ringing. When viewing the handset is inconvenient or the occasion requires quiet, the mobile handset usually is set in vibrating mode or silent mode. The incoming call is prompted by vibrating, but the caller number or identity can not be indentified from the handset vibrating.

Further, a keypad assembly is inevitably used in a mobile handset, for inputting information, such as control commands. However, the common keypad assembly only acts as an input device, but no any other function.

Therefore, there is room for improvement within the art.

BRIEF DESCRIPTION OF THE DRAWINGS

Many aspects of the present key button, the keypad assembly using the key button, and the portable electronic device using the keypad assembly can be better understood with reference to the following drawings. These drawings are not necessarily drawn to scale, the emphasis instead being placed upon clearly illustrating the principles of the present key button, the keypad assembly, and the portable electronic device. Moreover, in the drawings like reference numerals designate corresponding parts throughout the several views. Wherever possible, the same reference numbers are used throughout the drawings to refer to the same or like elements of an embodiment.

DETAILED DESCRIPTION OF EXEMPLARY EMBODIMENTS

Figure 1:
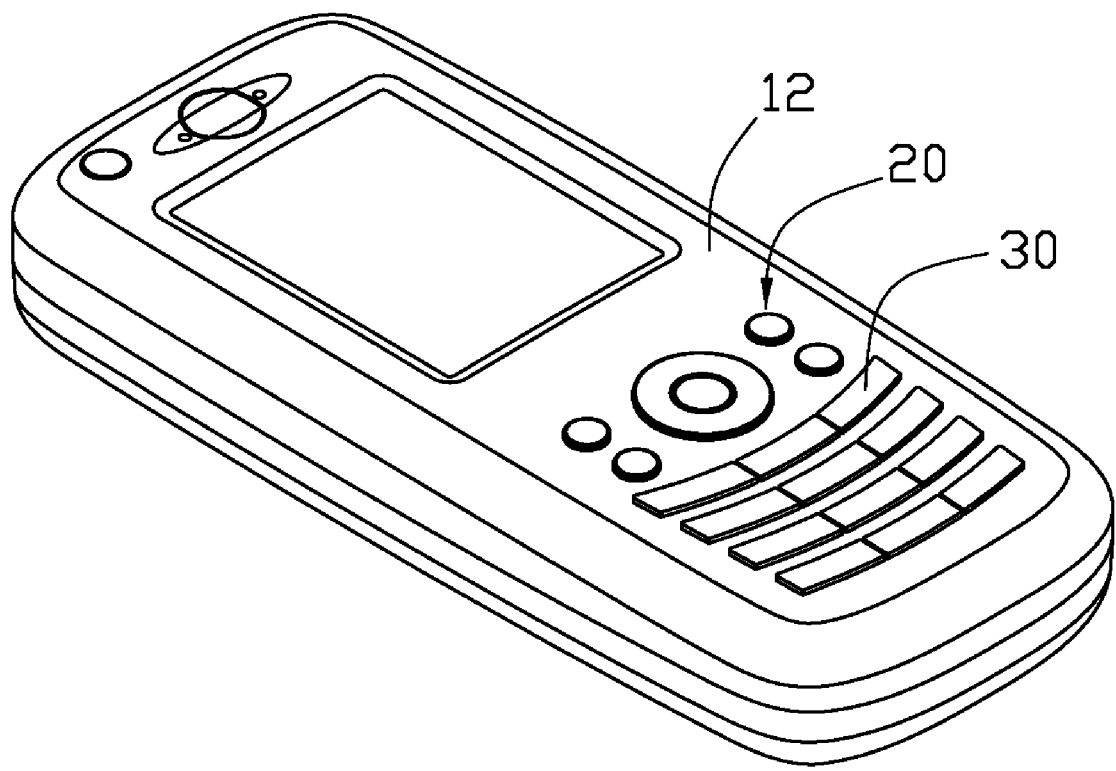
FIG. 1 is an isometric view of a portable electronic device using a keypad assembly in accordance with an exemplary embodiment, the keypad assembly including at least one key button.
Figure 2:
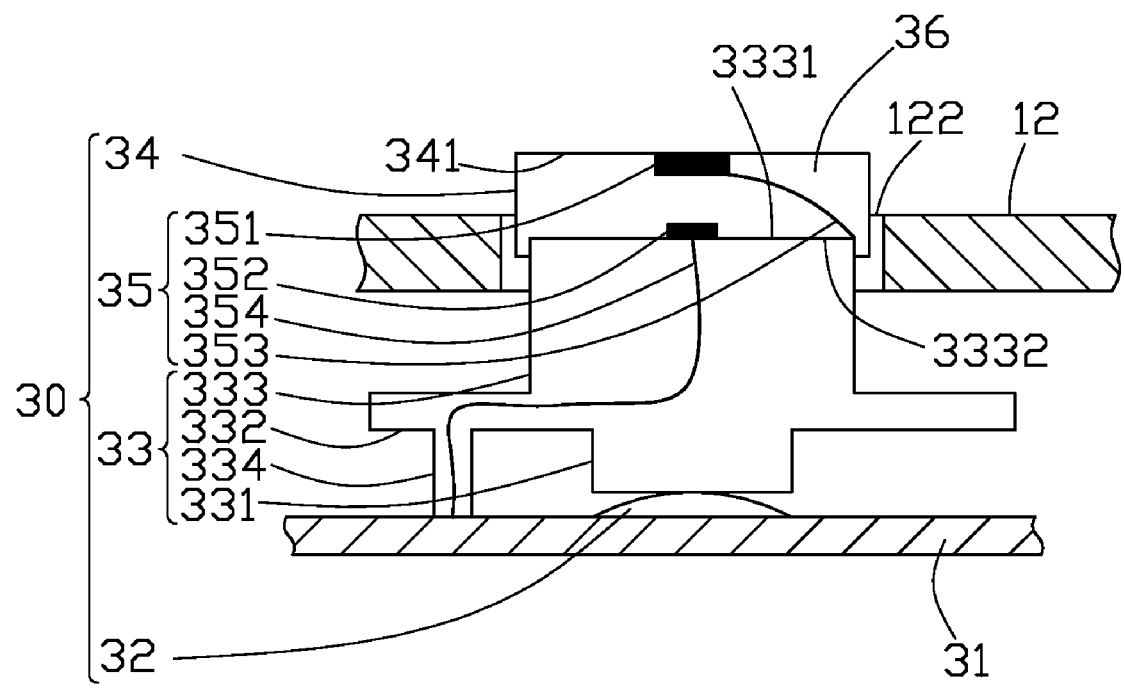
FIG. 2 is a partially cut-away view of an assembled key button in accordance with the exemplary embodiment.

The present key button and keypad assembly using at least one key button are described here in conjunction with the accompanying drawings in FIGS. 1 through 2. The keypad assembly 20 is suitably assembled in a portable electronic device 10, such as a mobile phone, a personal digital assistant, or the like.

Referring to FIGS. 1 and 2, the keypad assembly 20 incorporated within the portable electronic device 10 includes at least one key button 30. The at least one key button 30 is arranged and distributed on a surface of a housing 12 of the portable electronic device 10 in a pattern. At least one opening 122 is defined in the housing 12 for containing the at least one button 30.

Referring to FIG. 2, the at least one key button 30 of the exemplary embodiment each includes a circuit board portion 31, a pad portion 32, a supporting portion 33, a key portion 34 and a vibrating portion 35.

The circuit board portion 31 is assembled inside the portable electronic device 10, for providing power for the vibrating portion 35 and connecting the pad portion 32 to a central processor unit (not shown) of the portable electronic device 10.

The pad portion 32 is made of elastic material and has an arcuate surface. The pad portion 32 is fixed on the circuit board portion 31 for supporting the supporting portion 33 and acting as a cushion.

The supporting portion 33 is hollow and forms a cavity (not labeled). The supporting portion 33 includes a touching portion 331, a connection portion 332, a pressing portion 333 and a guiding portion 334. The touching portion 331 is provided in one end of the supporting portion 33 and is assembled adjacent to the pad portion 32. The pressing portion 333 is provided in the other end of the supporting portion 33 and including a first surface 3331 and an opposite second surface 3332. The connection portion 332 is provided between the touching portion 331 and the pressing portion 333. The guiding portion 334 is provided near an edge of the connection portion 332 and communicates with the pressing portion 333 and the connection portion 332. One end of the guiding portion 334 extends from the connection portion 332, the other end connects to the circuit board portion 31.

The key portion 34 is generally rectangular and hollow. The key portion 34 is retained in the opening 122 of the housing 12 and partly exposed out of the opening 122. The key portion 34 includes an inner surface 341 facing the first surface 3331 of the pressing portion 333. The key portion 34 may have at least one symbol (e.g., number) labeled therewith.

The vibrating portion 35 includes a metal member 351, an electric magnet 352, a elastic sheet 353 and a conducting wire 354. The metal member 35 is positioned near the center of the inner surface 341 of the key portion 34. The electric magnet 352 is positioned near the center of the first surface 3331 of the pressing portion 333 and facing the metal member 35. The elastic sheet 353 is an arcuate sheet. One end of the elastic sheet 353 is connected with the metal member 141 and the other end is connected with the electric magnet 352. The key portion 34 is slidably configured on one end of the pressing portion 333 of the supporting portion 33 near the first surface 3331. A containing area 36 is formed between the key portion 34 and the pressing portion 333. The elastic sheet 353 is received in the containing area 36 and connects the key portion 34 and the pressing portion 333. When the key portion 34 is pressed down by an outer force, the elastic sheet 353 is distorted, and then the pressing portion 333 may be pressed down. When the key portion 34 is released, the elastic sheet 353 rebounds to its original shape, and the key portion 34 should return the original location. The conducting wire 354 is contained in the cavity formed by the supporting portion 33 and connects the electric magnet 352 with the circuit board portion 31 through the guiding portion 334.

In normal state, the electric magnet 352 does not create a magnetic force, and there is a distance between the metal member 351 and the electric magnet 352. When power is provided to the electric magnet 352, the electric magnet 352 creates a magnetic force that attracts the metal member 351, and then the distance between the metal member 351 and the electric magnet 352 approaches zero, so that frequent changes of the distance between the metal member 351 and the electric magnet 352 can cause vibrating of the key portion 34.

In use, when the circuit board portion 31 supplies power to the electric magnet 352, the electric magnet 352 creates a magnetic force, and the metal member is attracted close to the electric magnet 352. When the circuit board portion 31 breaks off the power on the electric magnet 352, the magnetic force between the electric magnet 352 and the metal member 351 disappears, and the metal member 351 moves away from the electric magnet 352 and returns its original location. The metal member 351 brings the key portion 34 sliding far and near along the supporting portion 33.

When the circuit board portion 31 supplies power on the electric magnet 352 in a predetermined frequency, that is, when the power on the electric magnet 352 is turned on and off at a predetermined frequency, the key portion 34 can be moved close to and far way from the supporting portion 33 continually to form a vibrating mode of the key button 30. When a call is incoming, the vibrating portions 34 of the key buttons 30 corresponding to the incoming caller number are powered on and off, and vibrate one by one to prompt the incoming caller number. That is, the key buttons 30 corresponding to each number of the incoming number separately vibrates, and the user can figure out which numbers are vibrating.

One main advantage of the present exemplary embodiment is that a user can conveniently obtain the incoming caller number by feeling the vibrating key button 30, without viewing the LCD.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A key button, comprising:
   a circuit board portion;
   a pad portion made of elastic material and fixed on the circuit board portion;
   a supporting portion forming a cavity and connecting to the circuit board portion;
   a key portion slidably positioned on the supporting portion and forming a containing area between the key portion and supporting portion; and
   a vibrating portion contained in the cavity formed by the supporting portion and the containing area, the vibrating portion being powered by the circuit board portion, such that when the vibrating portion is powered on and off, the vibrating portion vibrates, causing the key portion to slide along the supporting portion.

2. The key button as claimed in claim 1, wherein the supporting portion includes a touching portion, a connection portion, a pressing portion and a guiding portion, the touching portion being positioned in one end of the supporting portion and assembled adjacent to the pad portion; the pressing portion being positioned in the other end of the supporting portion; the connection portion being positioned between the touching portion and the pressing portion.

3. The key button as claimed in claim 2, wherein the guiding portion being provided near an edge of the connection portion and communicates with the pressing portion and the connection portion.

4. The key button as claimed in claim 3, wherein one end of the guiding portion extends from the connection portion, the other end connects with the circuit board portion.

5. The key button as claimed in claim 2, wherein the pressing portion includes a first surface and a second surface opposite to the first surface.

6. The key button as claimed in claim 5, wherein the key portion includes an inner surface facing the first surface of the pressing portion.

7. The key button as claimed in claim 5, wherein the vibrating portion includes a metal member configured on the inner surface of the key portion, an electric magnet configured on the first surface of the pressing portion and facing the metal member, a elastic sheet connected the metal member with the electric magnet, and a conducting wire contained in the cavity formed by the supporting portion and connecting the electric magnet with the circuit board portion through the guiding portion.

8. The key button as claimed in claim 7, wherein the electric magnet in normal state does not create a magnetic force, and there is a distance between the metal member and the electric magnet.

9. The key button as claimed in claim 7, when the circuit board portion provides power to the electric magnet, the electric magnet creates a magnetic force that attracts the metal member.

10. A keypad assembly for a portable electronic device, comprising at least one key button, each of the at least one key button comprising:
    a circuit board portion;
    a pad portion made of elastic material and fixed on the circuit board portion;
    a supporting portion forming a cavity and connecting to the circuit board portion;
    a key portion slidably positioned on the supporting portion and forming a containing area between the key portion and supporting portion; and
    a vibrating portion contained in the cavity formed by the supporting portion and the containing area, the vibrating portion being powered by the circuit board portion, such that when the vibrating portion is powered on and off, the vibrating portion vibrates, causing the key portion to slide along the supporting portion.

11. The keypad assembly as claimed in claim 10, wherein the supporting portion includes a touching portion, a connection portion, a pressing portion and a guiding portion, the touching portion being provided in one end of the supporting portion and assembled adjacent to the pad portion; the pressing portion being provided in the other end of the supporting portion; the connection portion being provided between the touching portion and the pressing portion.

12. The keypad assembly as claimed in claim 11, wherein the guiding portion being provided near an edge of the connection portion and communicates with the pressing portion and the connection portion.

13. The keypad assembly as claimed in claim 12, wherein one end of the guiding portion extends from the connection portion, the other end connects with the circuit board portion.

14. The keypad assembly as claimed in claim 13, wherein the vibrating portion includes a metal member configured on an inner surface of the key portion, an electric magnet configured on the pressing portion and facing the metal member, a elastic sheet connected the metal member with the electric magnet, and a conducting wire contained in the cavity formed by the supporting portion and connecting the electric magnet with the circuit board portion through the guiding portion.

15. A portable electronic device, comprising:
   a housing;
   a keypad assembly mounted in the housing and comprising at least one key button, the at least one key button comprising:
   a circuit board portion;
   a pad portion made of elastic material and fixed on the circuit board portion;
   a supporting portion forming a cavity and connecting to the circuit board portion;
   a key portion slidably positioned on the supporting portion and forming a containing area between the key portion and supporting portion; and
   a vibrating portion contained in the cavity formed by the supporting portion and the containing area, the vibrating portion being powered by the circuit board portion, such that when the vibrating portion is powered on and off, the vibrating portion vibrates, causing the key portion to slide along the supporting portion.

16. The portable electronic device as claimed in claim 15, wherein the housing defines at least one opening for containing the at least one button.

17. The portable electronic device as claimed in claim 16, wherein key portion of each key button is retained in one of the at least one opening of the housing and partly exposed out of the opening.

18. The portable electronic device as claimed in claim 16, wherein the supporting portion includes a touching portion, a connection portion, a pressing portion and a guiding portion, the touching portion being provided in one end of the supporting portion and assembled adjacent to the pad portion; the pressing portion being provided in the other end of the supporting portion; the connection portion being provided between the touching portion and the pressing portion.

19. The portable electronic device as claimed in claim 18, wherein the vibrating portion includes a metal member configured on an inner surface of the key portion, an electric magnet configured on the pressing portion and facing the metal member, a elastic sheet connected the metal member with the electric magnet, and a conducting wire contained in the cavity formed by the supporting portion and connecting the electric magnet with the circuit board portion through the guiding portion.

\* \* \* \* \*